(12) United States Patent
Solomon et al.

(10) Patent No.: US 10,718,258 B2
(45) Date of Patent: Jul. 21, 2020

(54) SPARK-IGNITED DIRECT-INJECTION ENGINE COMBUSTION SYSTEMS

(71) Applicant: GM GLOBAL TECHNOLOGY OPERATIONS LLC, Detroit, MI (US)

(72) Inventors: Arun S. Solomon, Rochester Hills, MI (US); William F. Spruit, Grand Blanc, MI (US); David P. Sczomak, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 130 days.

(21) Appl. No.: 15/355,343

(22) Filed: Nov. 18, 2016

(65) Prior Publication Data

US 2018/0142607 A1 May 24, 2018

(51) Int. Cl.
| | | |
|---|---|---|
| *F02B 23/10* | (2006.01) | |
| *F02B 17/00* | (2006.01) | |
| *F02F 3/24* | (2006.01) | |
| *F02F 3/28* | (2006.01) | |

(52) U.S. Cl.
CPC .......... *F02B 23/101* (2013.01); *F02B 17/005* (2013.01); *F02F 3/24* (2013.01); *F02F 3/28* (2013.01); *Y02T 10/125* (2013.01)

(58) Field of Classification Search
CPC .......... F02B 23/101; F02B 17/005; F02F 3/24; F02F 3/28
See application file for complete search history.

(56) References Cited

U.S. PATENT DOCUMENTS

| | | | |
|---|---|---|---|
| 4,721,080 A | 1/1988 | Moriyasu et al. | |
| 4,770,138 A | 9/1988 | Onishi | |
| 5,000,144 A * | 3/1991 | Schweinzer | ........ F02B 23/0669 123/263 |
| 5,605,126 A * | 2/1997 | Hofmann | ............ F02B 23/0672 123/276 |

(Continued)

FOREIGN PATENT DOCUMENTS

| | | |
|---|---|---|
| CN | 1637245 A | 7/2005 |
| DE | 10145956 A1 | 4/2002 |

(Continued)

*Primary Examiner* — Joseph J Dallo
*Assistant Examiner* — Kurt Philip Liethen
(74) *Attorney, Agent, or Firm* — Quinn IP Law

(57) ABSTRACT

A direct-injection stratified charge internal combustion engine includes a combustion cylinder to receive an air-fuel mixture, and an air intake port to inlet air into the combustion cylinder. The direct-injection engine also includes a fuel injector configured to deliver fuel within the cylinder in a spray pattern substantially aligned to a cylinder central axis to create the air-fuel mixture. A spark igniter is located within a path of the spray pattern to ignite combustion of the air-fuel mixture. The direct-injection engine further includes a movable piston defining a lower boundary of the combustion cylinder to contain the combustion of the air-fuel mixture. The piston is configured to include a bowl portion having local geometric features located on an intake port side of the combustion cylinder to redirect fluid flow towards a vortex in fluid communication with a combustion location near the cylinder central axis.

20 Claims, 10 Drawing Sheets

(56) References Cited

U.S. PATENT DOCUMENTS

| | | | |
|---|---|---|---|
| 5,927,244 A * | 7/1999 | Yamauchi | F02B 23/101 |
| | | | 123/295 |
| 6,152,101 A * | 11/2000 | Parsi | F02B 23/06 |
| | | | 123/193.6 |
| 6,253,728 B1 | 7/2001 | Matayoshi et al. | |
| 6,378,490 B1 | 4/2002 | Ottowitz et al. | |
| 6,588,396 B1 | 7/2003 | Cleary et al. | |
| 6,612,282 B2 * | 9/2003 | Yu | F02B 23/104 |
| | | | 123/262 |
| 6,672,277 B2 | 1/2004 | Yasuoka et al. | |
| 6,705,275 B2 * | 3/2004 | Fukuzumi | F02B 17/005 |
| | | | 123/295 |
| 6,725,828 B1 | 4/2004 | Han et al. | |
| 6,745,745 B2 | 6/2004 | Huebler et al. | |
| 6,955,165 B2 | 10/2005 | Liu | |
| 7,055,490 B2 * | 6/2006 | Suzuki | F02B 17/005 |
| | | | 123/276 |
| 7,438,039 B2 * | 10/2008 | Poola | F02B 23/0672 |
| | | | 123/193.6 |
| 7,484,494 B2 | 2/2009 | Lippert et al. | |
| 9,885,277 B2 * | 2/2018 | Martinez | F02B 1/12 |
| RE46,806 E * | 4/2018 | Venugopal | |
| 2002/0170531 A1* | 11/2002 | Saito | F02B 17/005 |
| | | | 123/295 |
| 2005/0139191 A1* | 6/2005 | Tanaka | F02B 23/101 |
| | | | 123/302 |
| 2015/0107559 A1* | 4/2015 | Bowing | F02B 23/0639 |
| | | | 123/47 R |

FOREIGN PATENT DOCUMENTS

| | | | | |
|---|---|---|---|---|
| GB | 2555116 A | * | 10/2016 | F02F 3/26 |
| JP | 4155184 B2 | | 9/2008 | |

* cited by examiner

SPARK-IGNITED DIRECT-INJECTION ENGINE COMBUSTION SYSTEMS

STATEMENT REGARDING FEDERALLY SPONSORED RESEARCH OR DEVELOPMENT

This invention was supported by the government under Contract No. DE-EE0006853 awarded by the U.S. Department of Energy. The government has certain rights in the invention.

TECHNICAL FIELD

The present disclosure relates to combustion management of spark-ignited direct-injection internal combustion engines.

INTRODUCTION

Fuel injectors regulate fuel delivery for combustion engines, either into an intake manifold upstream of a combustion chamber, or directly into the combustion chamber. Atomization of the fuel spray can enhance vaporization and mixture with air in order to achieve optimal combustion and thus engine power generation. Additionally, atomization may promote a more complete burn of the air-fuel mixture, minimizing the formation of undesirable byproducts of combustion, and preventing uncontrolled combustion events.

Spark ignition engines with direct fuel injection (SIDI) may operate using a combination of a stratified combustion charge strategy and a homogeneous combustion charge strategy, depending upon power demands and other engine operating conditions. Under high load conditions, vertical vortices, also referred to as tumble fluid flows, can enhance the air-fuel mixture and promote improved combustion. However, an SIDI engine may be operated at low load conditions using a lean air-fuel ratio and a stratified charge, and tumble fluid flows can present unique challenges regarding maintaining optimal combustion conditions.

SUMMARY

A direct-injection stratified charge internal combustion engine includes a combustion cylinder to receive an air-fuel mixture, and an air intake port to inlet air into the combustion cylinder. The direct-injection engine also includes a fuel injector configured to deliver fuel within the cylinder in a spray pattern substantially aligned to a cylinder central axis to create the air-fuel mixture. A spark igniter is located within a path of the spray pattern to ignite combustion of the air-fuel mixture. The direct-injection engine further includes a movable piston defining a lower boundary of the combustion cylinder to contain the combustion of the air-fuel mixture. The piston is configured to include a bowl portion having an angled re-entrant edge located on an intake port side of the combustion cylinder to redirect fluid flow towards a vortex in fluid communication with a combustion location near the cylinder central axis.

A movable piston is arranged to travel within a combustion chamber of a direct-injection engine according to a combustion cycle. The movable piston includes a side portion configured to seal against a side of the combustion chamber and a top surface defining a lower boundary of the combustion cylinder to contain an air-fuel mixture during the combustion cycle. The movable piston also includes a piston bowl formed in the top surface to receive a fuel injection dispensed at a location generally along a central cylinder axis. The piston bowl is configured to define a floor portion that extends laterally in a first direction towards the side portion a distance from the central cylinder axis that is greater than an opposing second direction from the central cylinder axis.

A direct-injection stratified charge internal combustion engine includes a combustion cylinder to receive an air-fuel mixture, and an air intake port to inlet air into the combustion cylinder. The direct-injection engine also includes a fuel injector configured to emit a fuel spray pattern within the cylinder at a location substantially near a cylinder central axis to create the air-fuel mixture. A spark igniter is located within a path of the fuel spray pattern to ignite combustion of the air-fuel mixture. The direct-injection engine further includes a movable piston defining a lower boundary of the combustion cylinder to contain the combustion of the air-fuel mixture. The movable piston includes a piston bowl defining a floor portion that extends a lateral distance towards the side portion in a first direction from the central cylinder axis greater than a distance in an opposing second direction from the central cylinder axis.

DETAILED DESCRIPTION

Figure 1:
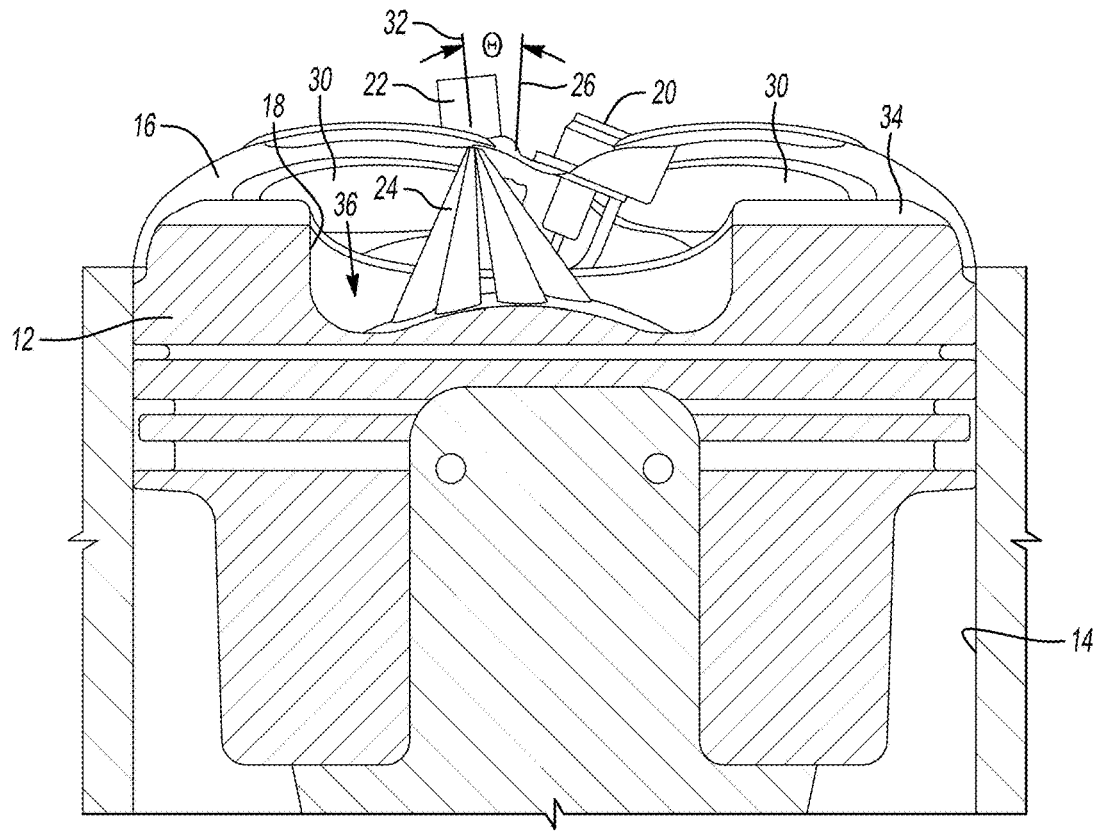
FIG. 1 is a partial cross-section of a combustion chamber along line 1-1 of FIG. 3.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Stratified-charge spark-ignition direct injection (SIDI) internal combustion engines may operate to reduce overall fuel consumption of gasoline engines. However, even in SIDI engines incomplete combustion under certain conditions limits efficiency and leads to increased byproducts in the engine exhaust. Incomplete combustion can be due to the inability to maintain an appropriate air-fuel mixture in the vicinity of the spark plug resulting in under-mixing or over-mixing of the fuel with the air. These undermixed and overmixed regions relate to increases in fuel consumption as well as hydrocarbon and carbon monoxide emissions.

Several different design strategies may be used to control the fuel injection and spark timing for SIDI engines. For example, wall-guided combustion systems largely use swirl-type fluid flows (i.e., horizontal flow vertices) induced by the fuel injector and intake ports in combination with one or more walls of a combustion chamber and top surface of a piston to redirect the fuel spray toward the spark plug. To avoid excessive spray impingement on the piston surface at high back pressures (i.e., high pressure in the combustion chamber), and to allow the fuel enough time to rebound from the piston to the spark location, these systems require relatively early injection timing. The increased fuel path travel of wall-guided systems from a side-mounted injector, down to a top surface of the piston, and back up to the spark plug creates ample opportunity for overmixing, leading to less than all of the fuel being burned. In addition, during operation in a stratified-charge mode, a significant amount of fuel may impinge on the piston surface leading to smoke and hydrocarbon emissions. To improve combustion stability at light load operation (approximately less than 2 bar BMEP), an air intake may need to be throttled to reduce air induction, resulting in increased pumping losses and reduced efficiency.

In a second example, spray-guided combustion systems often use the fuel spray momentum to form the air-fuel mixture. In this case, the fuel injector and spark plug may be more closely arranged in space within the cylinder to more quickly ignite fuel emitted from the fuel injector. Related to the close proximity, these systems may require a close timing of the spark and fuel injection, leaving only a small window near the end of injection for firing of the spark plug. The shorter timing limits control flexibility and allows less time for the fuel droplets to evaporate. This can lead to burning of the droplets and very fuel-rich mixtures, resulting in smoke emissions. Also related to the proximity of the fuel injector and the spark plug, such systems may be more intolerant to tumble fluid flows (i.e., vertical vortices) of the air-fuel mixture.

Figure 2:
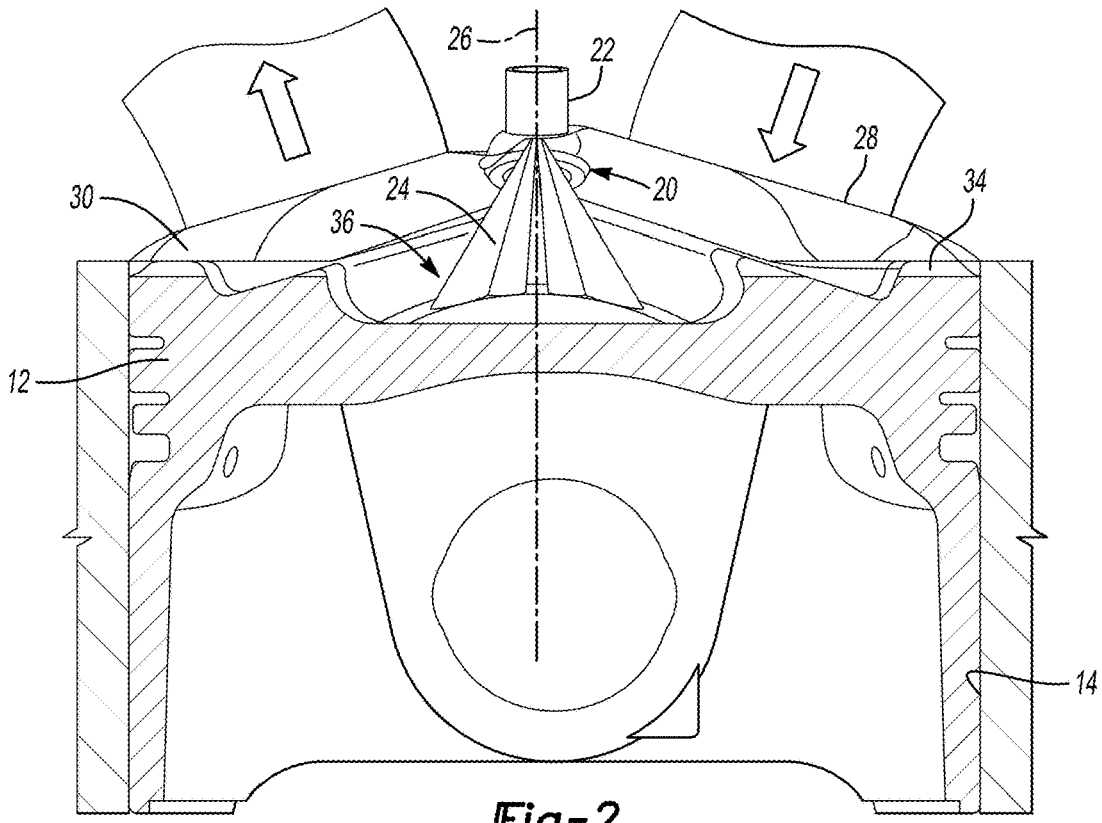
FIG. 2 is a partial cross-section of a combustion chamber along line 2-2 of FIG. 3.
Figure 3:
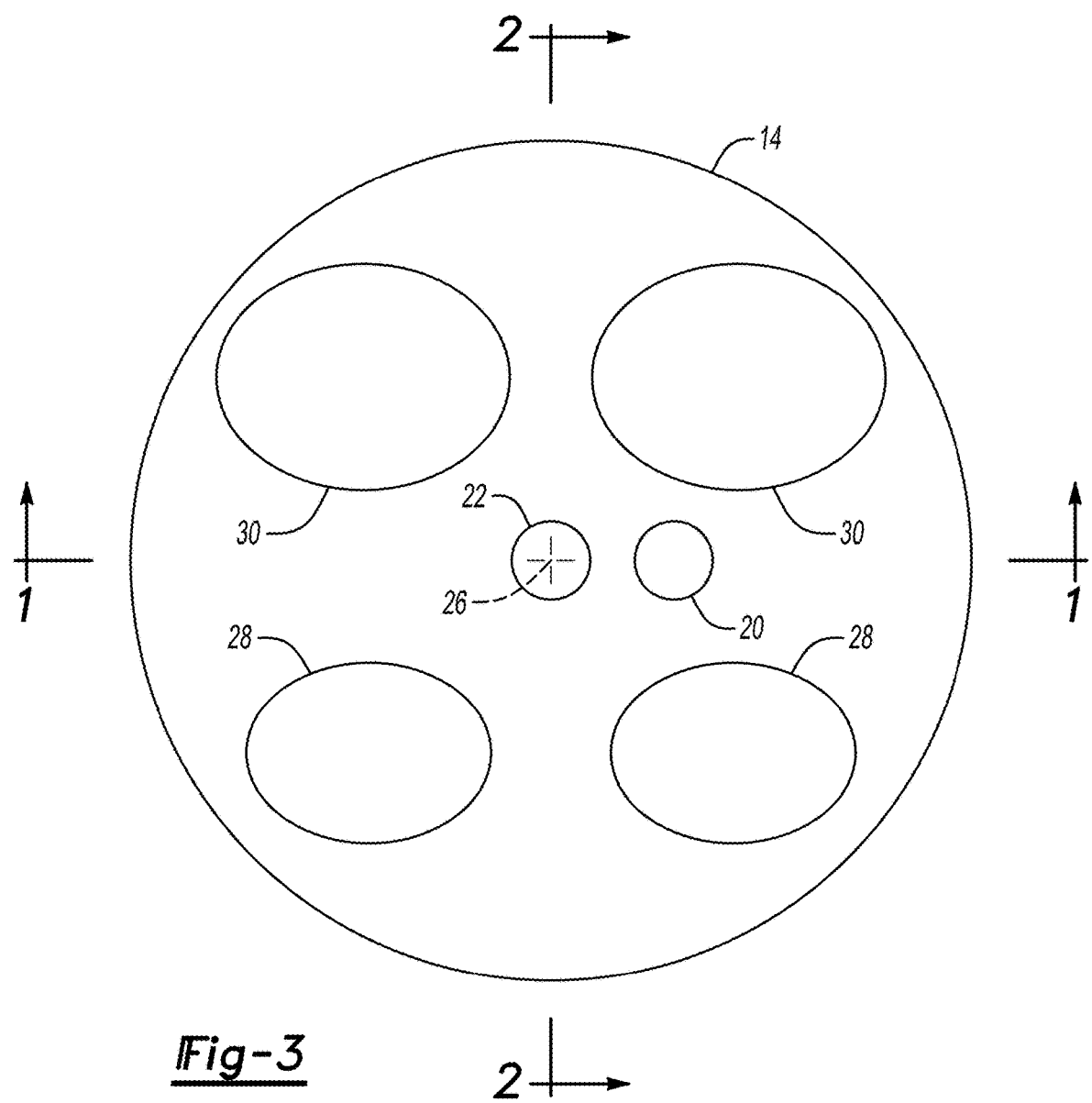
FIG. 3 is a schematic top view of a combustion chamber.

Referring to FIG. 1 through FIG. 3, a combustion chamber of an exemplary SIDI engine is provided. A piston 12 is movable within a closed end cylinder 14 and cooperates with the cylinder 14 to define a variable-volume combustion chamber 16. The piston 12 includes a formed recess 18 located in a direction into which fuel is primarily injected. The combustion chamber 16 is configured with a spark plug 20 and a fuel injector 22 cooperatively arranged to regulate the air-fuel mixture and the timing of combustion. A fuel spray pattern 24 distributes fuel throughout the chamber 16 for combustion. The fuel spray pattern 24 from the injector 22 is arranged such that the spark igniter of the spark plug 20 is located within a path of the spray pattern. With specific reference to the cross-sectional view of FIG. 2, the fuel injector 22 has its spray tip located at a substantially central location within the cylinder 14. Also, the spray pattern 24 is substantially aligned to a cylinder central axis 26 to create the air-fuel mixture. The spark plug 20 is offset with respect to the fuel injector 22, but also aligns with the central axis 26 in the view of FIG. 2. The fuel injector 22 and the spark plug 20 are arranged in a longitudinal layout such that intake ports 28 are on a first side of an axis defined by a line through the fuel injector and the spark plug, and the exhaust ports 30 are on an opposing second side of the line through the fuel injector and the spark plug. In some embodiments, there may be offsets between spray tip location of the fuel injector and the central cylinder axis 26 due to engine layout, packaging and other consideration. Notwithstanding any necessary offset values, according to aspects of the present disclosure, the fuel injection location is located at a most central location as practicable to create a combustion region near the center of the combustion chamber.

With specific reference to the cross section view of FIG. 1, an alignment axis 32 of the fuel injector 22 is inclined with respect to the cylinder central axis 26 defining an angle θ. While the example of FIG. 1 depicts a positive value for θ, it should be appreciated that some examples may include a fuel injector that is aligned substantially parallel to the central axis 26 in each of two views which are orthogonal with respect to each other (i.e., θ substantially zero). According to one example, θ is equal to about 5 degrees. The location and orientation of each of the fuel injector 22 and the spark plug 20 may account for such considerations as packaging, injector spray pattern, spark gap protrusion, distance between spark gap and injector spray tip, etc. Irrespective of the injector angle, the injection location is located generally near the central cylinder axis 26.

In the example of FIGS. 1 and 2, combustion is controlled by the design of the fuel spray jet. That is, the top surface 34 of the piston 12 defines a lower portion of the combustion chamber. And, the top surface 34 includes a bowl portion 36 as part of the recess 18 used to contain the fuel air mixture during a compression stroke. According some examples, the volume of the bowl portion 36 is about 50 percent of the total chamber volume when the piston is at top dead center (TDC). The activation of the spark plug is timed such that a trailing edge of the fuel spray is ignited by the spark plug. In order to influence the overall distribution of fuel density across the combustion chamber and avoid undesirable saturation, the fuel spray may be separated into multiple, smaller fuel pulses where the ignition spark may be timed according to a subsequent fuel pulse.

In order to meet full-load torque and power requirements combustion may benefit from intake ports arranged to cause high tumble, or vertical vortices in the fluid flow. At moderate and low load conditions, the SIDI engine is configured to operate using a lean air-fuel ratio. In these cases, high tumble can be less desirable for the lean stratified combustion performance during moderate and low loads, because it can disrupt the stratification process and prevent adequate containment of the air-fuel charge within the piston bowl.

Referring to FIG. 4A through FIG. 4E, computer predicted fuel density and air flow vectors are shown for an example partial-load lean stratified operating condition. Each of the figures reflects an increment of time during a compression stroke of the piston. The view of the each of the simulation results corresponds to the cross-sectional view of FIG. 2. The relative timing of each of the increments is represented by the rotation angle of the crankshaft in crank angle degrees (CAD). CAD refers to the position of the engine's crankshaft in relation to the piston as it travels inside of the combustion cylinder. Each of the CAD values corresponds to a position of the piston head relative to the TDC position. From FIG. 4A to FIG. 4E, the piston head progresses towards the TDC position (e.g., CAD=720 degrees) during the compression stroke of the combustion cycle.

Figure 4A:
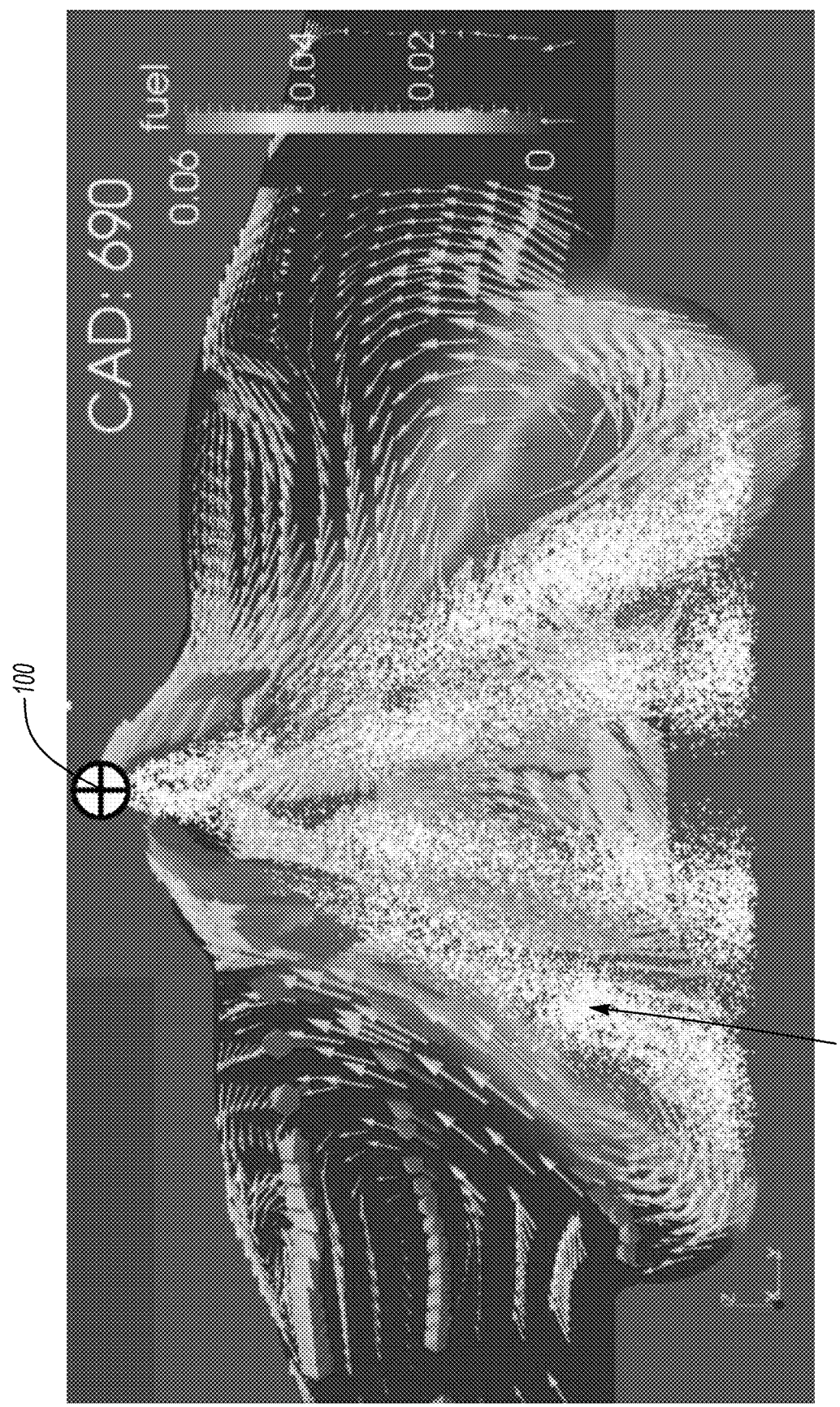
FIGS. 4A-4E are computer simulation results depicting air-fuel ratio contours and fluid flow vectors.

Referring to FIG. 4A, an initial fuel spray pattern 124 is emitted from a fuel injection location 100 near a central cylinder axis at a timing corresponding to about CAD 690 degrees. Near a trailing end of the initial fuel spray pattern 124, the fuel is ignited by the spark plug.

Figure 4B:
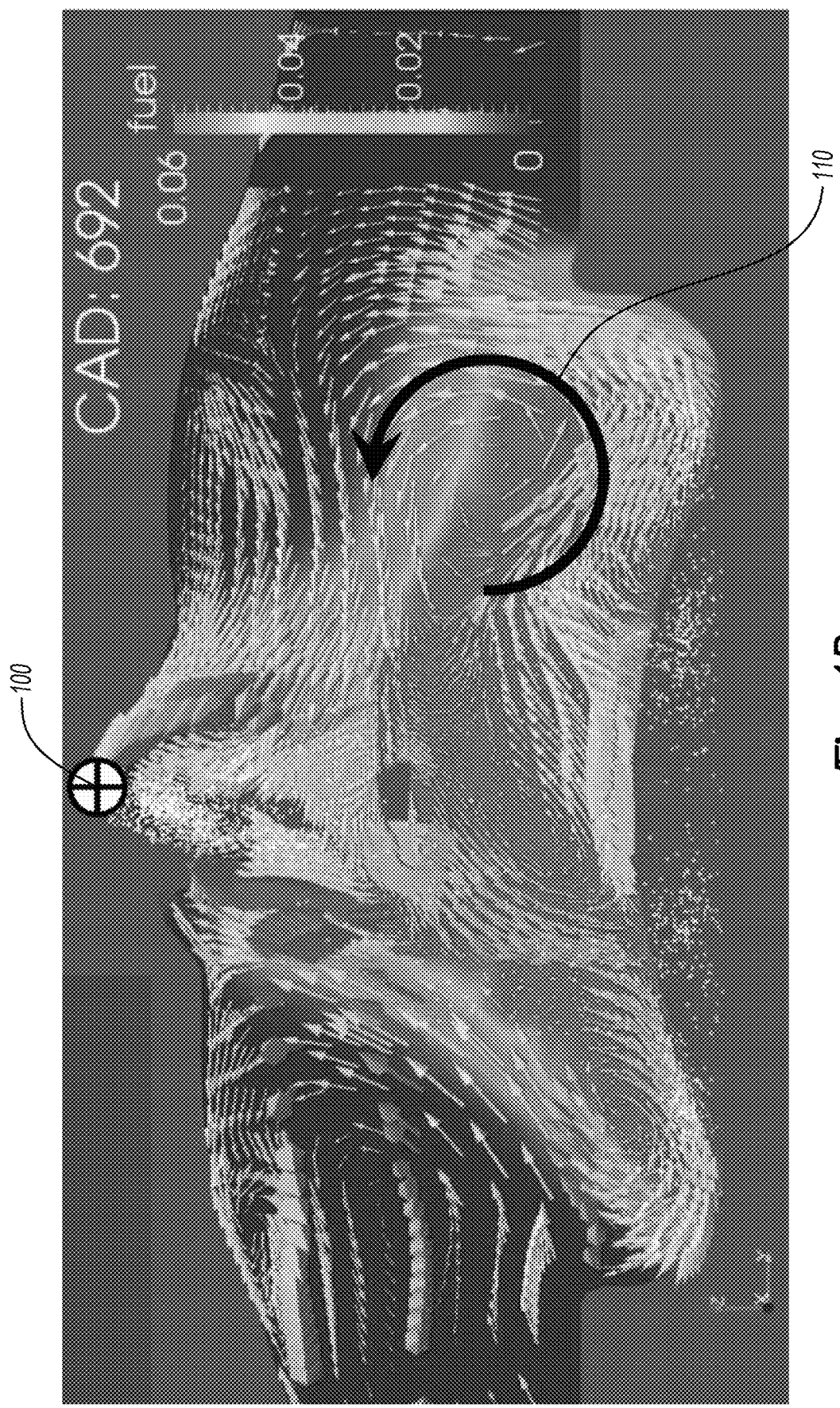

FIG. 4B depicts the predicted fluid flow vectors and fuel density of the air-fuel mixture corresponding to about CAD 692 degrees. Arrow 110 indicates the presence of a predicted tumble vortex due to the flow operating conditions. The location of the vortex represented by arrow 110 is near a more fuel-dense region and thus contributes to the mixture of the fuel and air within the cylinder by drawing fuel dense portions of the mixture back towards the center portion where combustion was initiated.

Figure 4C:
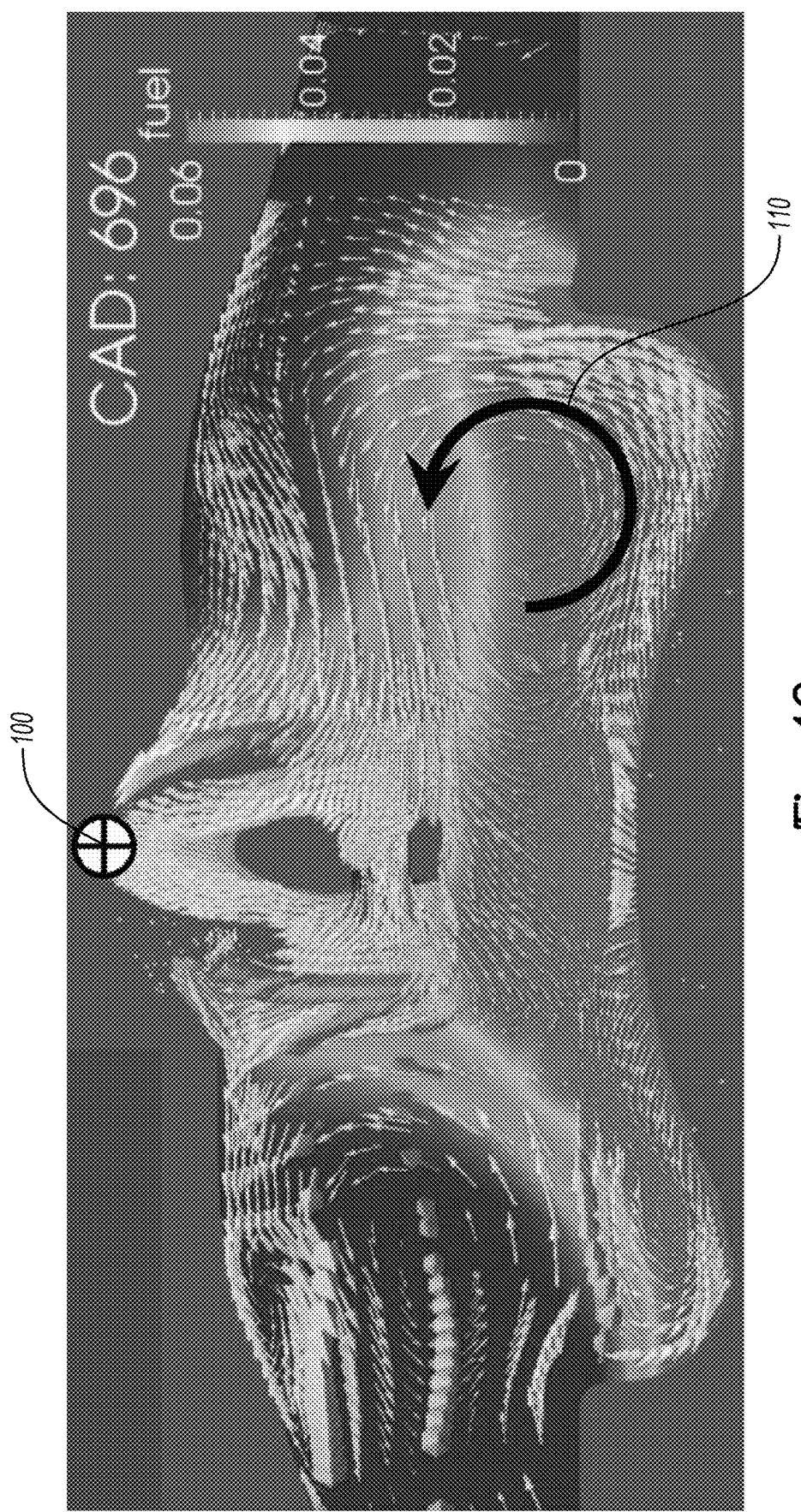

Referring to FIG. 4C corresponding to about CAD 696 degrees, it can be seen that the higher fuel content regions begin to distribute laterally across the cylinder further away from the center. It should be noted that the tumble vortex represented by arrow 110 is generally in the same position, but contributes to push portions of the higher fuel content regions away from the center combustion area.

Figure 4D:
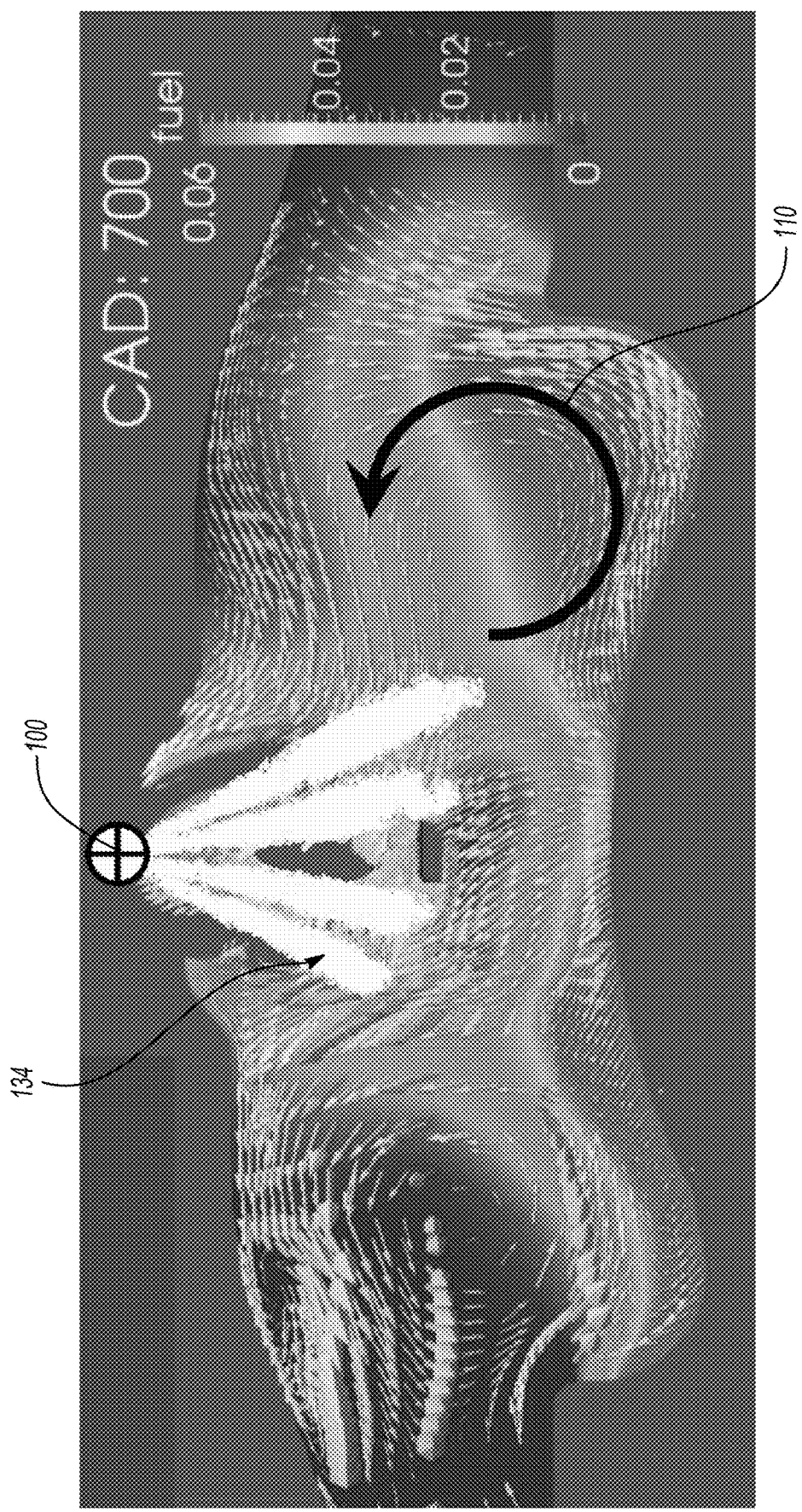

Referring to FIG. 4D which corresponds to about CAD 700 degrees, a subsequent fuel pulse having a fuel spray pattern 134 is injected later in the compression stroke into the piston bowl so it can be contained within the bowl as it mixes with air remaining in the cylinder. In the example of FIG. 4A through FIG. 4E, there is about a 1 millisecond dwell between the initial fuel pulse at CAD 690 degrees and the subsequent second pulse at about CAD 700 degrees. The spray pattern 134 of the subsequent fuel injection further influences both of the fluid flow of the air-fuel mixture and the fuel density distribution across combustion cylinder.

Figure 4E:
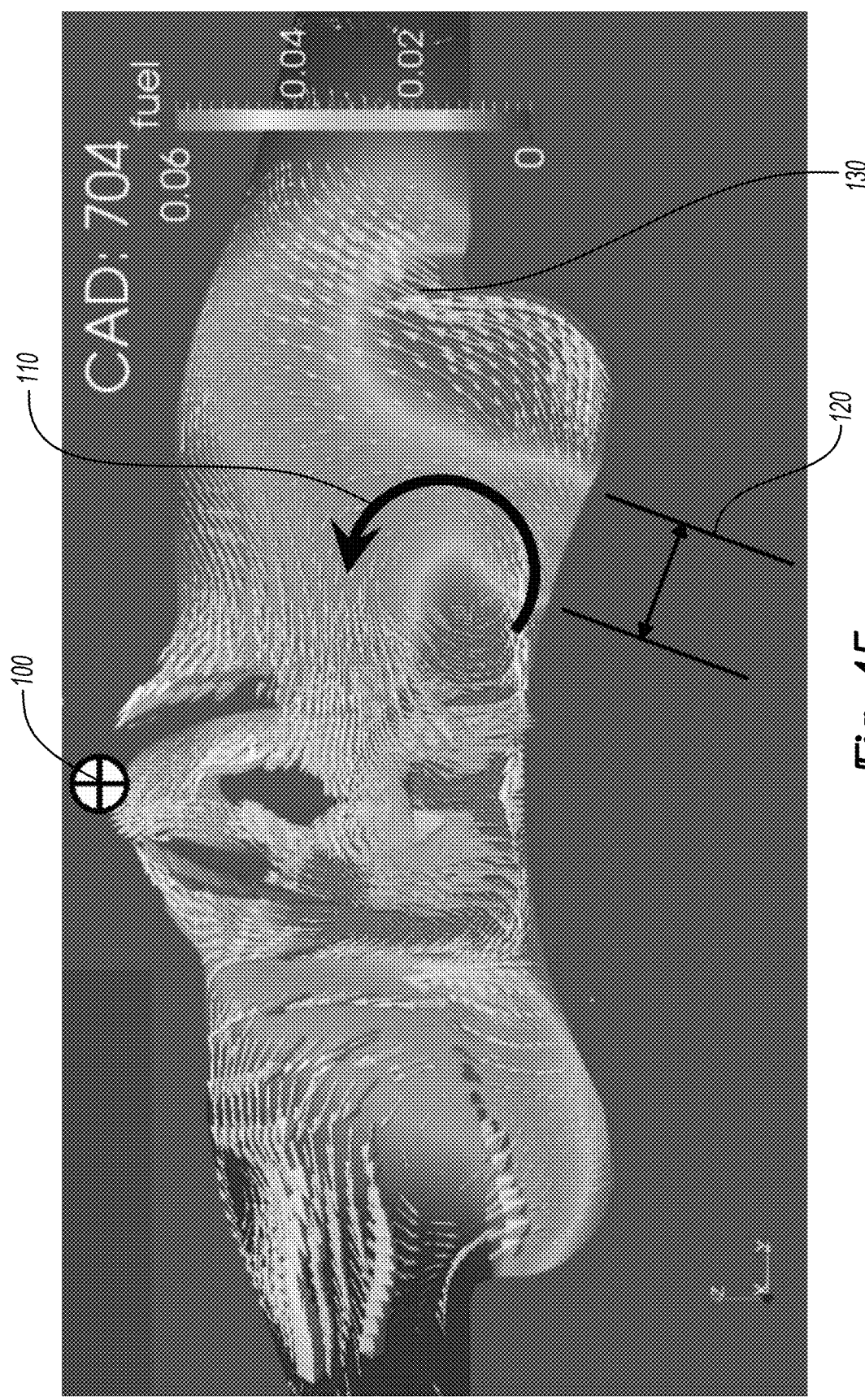

Referring to FIG. 4E corresponding to about CAD 704 degrees, the center portion of the combustion area has a higher fuel density related to the subsequent fuel pulse. The combination of the subsequent fuel pulse and the corresponding late-cycle combustion near the center of the bowl may actually push previous unburnt fuels on the intake port side further away from the combustion area. As can be seen from FIG. 4E, the position of the high tumble vortex represented by arrow 110 on the intake port side shifts closer to the center of the bowl and is less effective at pulling the high fuel density portions back toward the center as combustion progresses with time. A separation gap 120 may be induced where a little or no fuel density exists between the combustion area towards the center of the cylinder and a higher fuel density region 130 near an edge of the piston bowl. Stated another way, the higher fuel density region 130 becomes separated from the combustion area allowing some of the air-fuel charge to remain unburned. Further, portions of the air-fuel charge region 130 begin to escape the piston bowl altogether, causing suboptimal combustion efficiency resulting in high fuel consumption, high hydrocarbon and carbon monoxide emissions, and high combustion instability.

According to aspects of the present disclosure, the geometry of the piston bowl may be configured to take advantage of tumble vortices under a wider range of load conditions. That is, the shape may be conducive to better contain the air-fuel mixture during low-load situations having a high degree of tumble flow, which may not normally be desirable for lean stratified combustion conditions. The shape of the bowl may be configured to coincide with the tumble effects to maximize combustion efficiency at these low-load conditions. The residual high fuel density portions of the flow can be urged to remain in better contact with tumble vortices to reduce or eliminate the amount of fuel which escapes the combustion area occurring largely near the center of the piston bowl.

A number of different piston bowl designs are provided in the present disclosure that each contribute to containing the air-fuel charge within the piston bowl during the combustion process, even in the presence of a high tumble fluid flows. Each of the bowl designs contribute to prevent spillover into the squish region of un-combusted air-fuel mixture. By containing the air-fuel charge within the bowl, the flame is able to reach all of air-fuel mixture within the piston bowl. Combustion efficiency is improved, which results in decreased fuel consumption, decreased hydrocarbon and carbon monoxide emissions, and improved combustion stability. Further, the various bowl shapes do not inhibit the function of the high tumble flows during higher loads, preserving full-load torque and power requirements.

Figure 5:
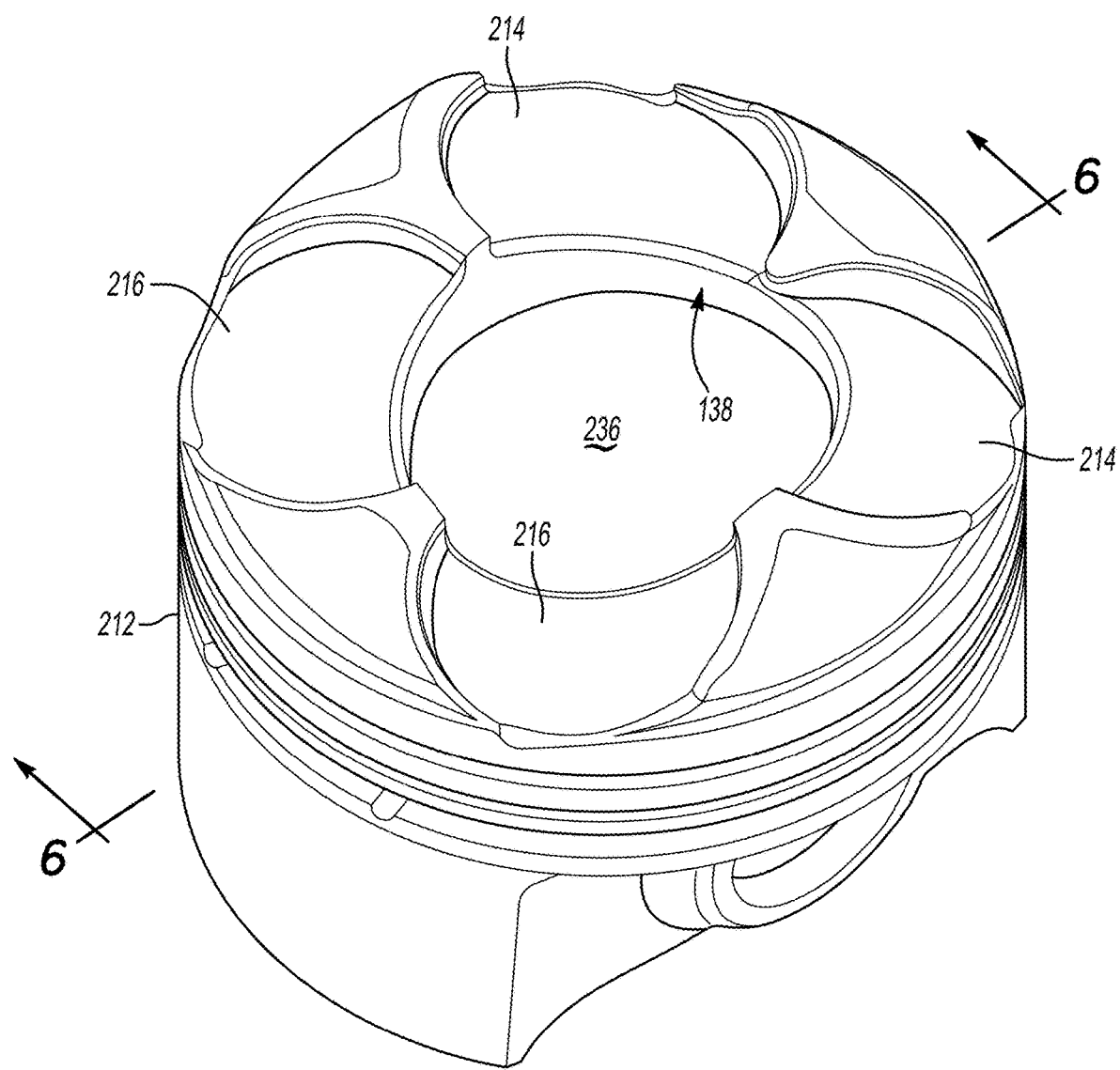
FIG. 5 is a perspective view of a piston head according to an embodiment.

FIG. 5 is a perspective view of a piston head 212 arranged to maximize combustion efficiency of high tumble flows within the combustion cylinder for both high load and low load conditions. The piston 212 may include a pair of cutouts 214 corresponding to the air intake valves. The piston head 212 may also include a pair of cutouts 216 which correspond to the exhaust valves of the combustion cylinder. A center bowl portion 236 is configured to enhance combustion near a center of the cylinder with multiple fuel pulses and tumble flow vortices. More specifically, a wall 138 on the intake side of the combustion chamber may be uniquely configured to maintain outer portions of the air-fuel mixture in connection with the combustion region near the center of the bowl 236. The wall 138 may include a combination of any number of enhancements to promote complete combustion during low load operating conditions where tumble fluid flows are present.

Figure 6:
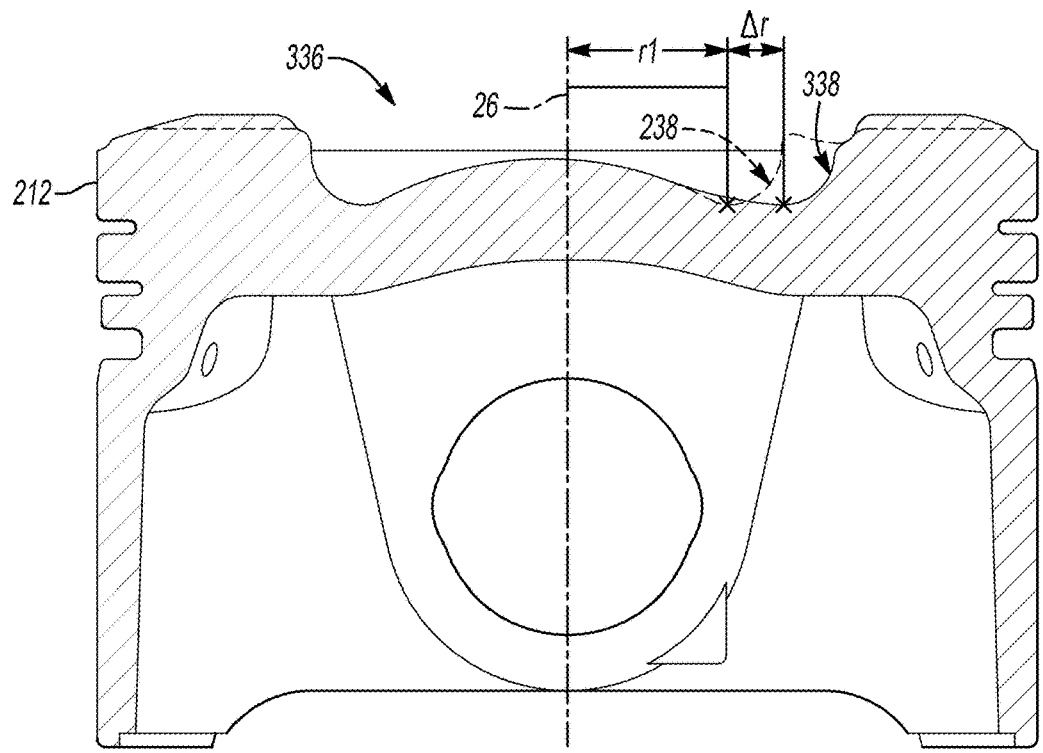
FIG. 6 is a cross-section of a piston head along line 6-6 according to a first alternate embodiment.

Referring to FIG. 6, piston 212 is enhanced to maximize combustion efficiency. A floor portion of the piston bowl is extended in the direction of the intake ports, allowing the air-fuel mixture to travel a longer path within the bowl. The result is a higher volume of the air-fuel mixture remaining in the piston bowl, as opposed to exiting the bowl and escaping the combustion area. Since the mixture remains in connection with other portions of the mixture undergoing combustion, it allows the flame to catch up to the unburnt mixture and accomplish more complete combustion. A first enhanced wall 338 is shifted radially outward towards an edge of the cylinder head 212 relative to the baseline wall 238 on the intake port side to enhance combustion as described immediately above. The result is a piston bowl 338 which is elongated in a direction which enhances the connection between the outer portions of the fuel air mixture and the combustion portions of the mixture. According to some examples, the bowl 336 is asymmetric relative to a vertical axis such that a radial distance on the intake port side is increased from a value of r1 to a value of r1+$\Delta$r. In a specific example, the radial distance is increased by about 15 to 35 percent (i.e., $0.15*r1<\Delta r<0.35*r1$). In a specific example, the bowl 336 defines an asymmetric shape relative to the cylinder center axis 26. As discussed above, there may be offsets between a center axis of the bowl and a center axis of the combustion chamber.

Figure 7:
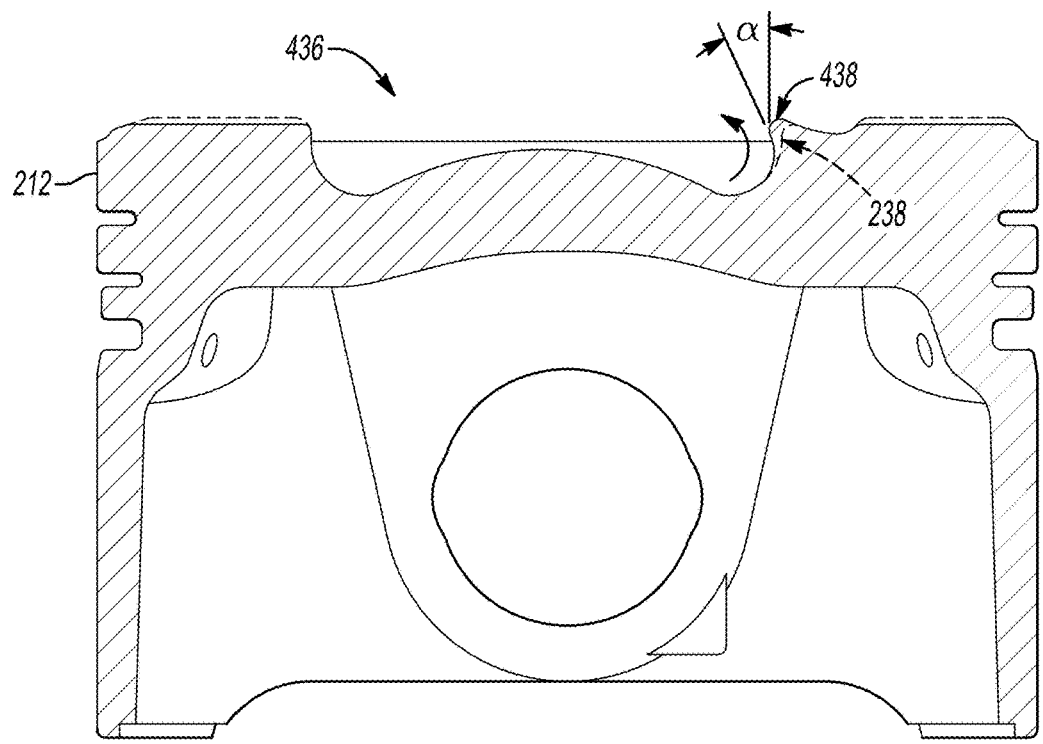
FIG. 7 is a cross-section of a piston head along line 6-6 according to a second alternate embodiment.

Referring to FIG. 7, piston 212 is enhanced in a different fashion to enhance combustion efficiency. The baseline wall 238 may be reoriented to influence the flow direction of the fuel air mixture which passes by it. The result is less fluid flow traversing the edge of the bowl 436 and better continuity between the outer portions of the fuel air mixture and the combustion portions of the mixture near the center of the bowl. A second enhanced wall 438 is angled by α degrees on the intake port side of the cylinder to enhance reentry of fluid flow back toward the center of the bowl. According to some examples, 20 degrees≤α≤40 degrees. According to one specific example, the angle α is equal to about 28 degrees.

Figure 8:
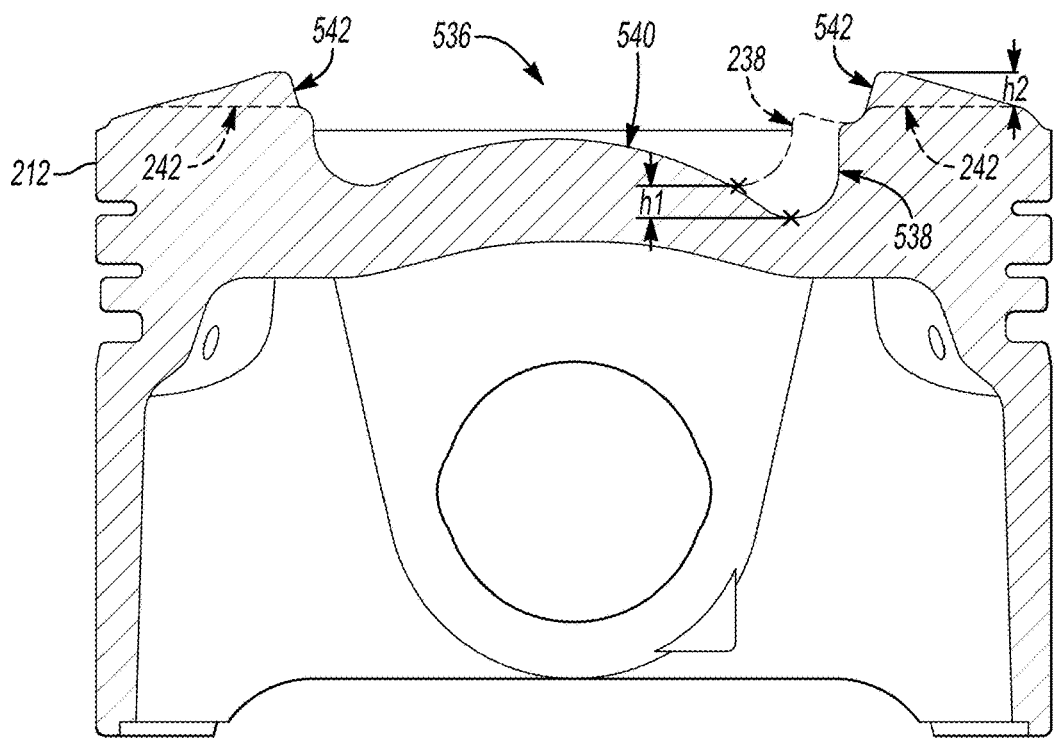
FIG. 8 is a cross-section of a piston head along line 6-6 according to a third alternate embodiment.

Referring to FIG. 8, the wall 538 of the piston bowl 536 is extended laterally in the direction of the intake ports as described above, but also the floor portion 540 is made deeper to further increase the volume of the air-fuel mixture trapped within the piston bowl 536. The floor portion 540 is made deeper by a dimension of about h1. In some examples, the bowl is deepened by an amount from about 1 millimeter to 5 millimeters. According to a specific example, h1 may be about 3.2 millimeters. Containing more of the fuel air mixture within the bowl also allows the flame to catch up to the unburnt mixture and accomplish more complete combustion. A second depth enhancement provided in the example of FIG. 8 includes increasing the height of the baseline top surface 242. An increased height may help to resist fluid flow over the edge of the piston bowl 536 as the piston 212 approaches TDC. The top surface 242 may define an extension wall 542 on the intake port side to further resist fuel and air from traversing the piston bowl edge due to fluid flow vertical tumble within the combustion cylinder. The baseline top surface 242 is raised by a dimension h2 to assist in containing the fuel air mixture. In some examples, the top surface is raised by an amount from about 3 millimeter to 7 millimeters. According to a specific example, h2 may be about 4.8 millimeters. It should be appreciated that the height h2 may be limited by the design gap between the piston top surface at TDC and an underside of a cylinder cap (not shown) which may be the upper bound of the cylinder volume. In some examples, the baseline top surface 242 of the piston 212 is raised on both of the intake port side of the cylinder, as well as the exhaust port side of the cylinder. Further, the additional mass of the extension wall 542 may be configured to change the cylinder volume thereby affecting the overall compression ratio of the combustion cycle.

Increasing the volume of the air-fuel mixture that is trapped in the piston bowl enhances combustion during moderate and low load conditions, but may carry some drawbacks at high load operating conditions. For example, there may be a higher risk of trapping unburned or unmixed air or fuel at the base of the bowl during wide open throttle conditions which operate using the highest fuel masses during the combustion cycle. The addition of more volume in a local area of the bowl may lend itself to not allowing enough time to combust the increased fuel and or air mass.

Figure 9:
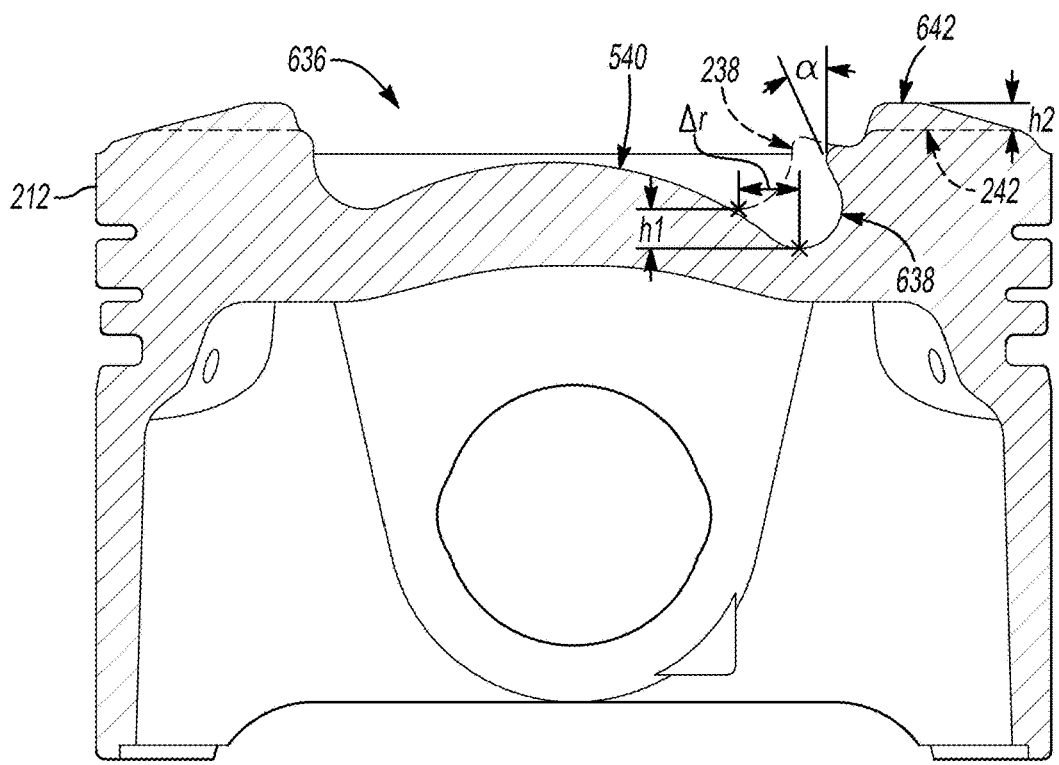
FIG. 9 is a cross-section of a piston head along line 6-6 according to a fourth alternate embodiment.

Referring to FIG. 9, a combination of each of the combustion enhancement features may be implemented on a single piston design. That is, each of the flow travel enhancement Δr, re-entry enhancement α, local bowl depth enhancement h1, and top surface height enhancement h2 may be used together to yield an additive benefit relative to each individual feature. Overall, the collective enhancements help to reduce separation of high air-fuel ratio areas such that when a subsequent fuel pulse and corresponding fuel burn occurs, there is no gap regions due to fuel air mixture escaping the piston bowl. It should be appreciated that while the example of FIG. 9 includes a combination of four types of piston geometry enhancements, any number or combination of the enhancements disclosed herein may be used according to aspects of the present disclosure.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A direct-injection stratified charge internal combustion engine comprising:
    a combustion cylinder configured to receive an air-fuel mixture;
    intake ports configured to inlet air into the combustion cylinder;
    exhaust ports configured to outlet exhaust from the combustion cylinder;
    a fuel injector configured to deliver fuel within the combustion cylinder in a spray pattern substantially aligned to a cylinder central axis to create the air-fuel mixture;
    wherein the fuel injector includes a tip that is centrally located within the combustion cylinder, and the tip is configured to spray the fuel in the spray pattern;
    wherein the fuel injector is centrally located between the intake ports and the exhaust ports;
    a spark igniter is located within a path of the spray pattern such that a trailing edge of the spray pattern when the spray pattern is initially ejected from the tip is ignited to combustion of the air-fuel mixture;
    wherein a plane intersects the cylinder central axis, the fuel injector and the spark igniter such that the spark igniter aligns with the cylinder central axis and is offset from the fuel injector;
    wherein the intake ports are disposed along the combustion cylinder relative to a first side of the plane to define an intake port side of the combustion cylinder;
    wherein the exhaust ports are disposed along the combustion cylinder relative to a second side of the plane to define an exhaust port side of the combustion cylinder;
    wherein the first and second sides of the plane oppose each other;
    a movable piston defining a lower boundary of the combustion cylinder to contain the combustion of the air-fuel mixture, wherein the movable piston includes a bowl portion having an angled re-entrant edge located only on the intake port side to redirect fluid flow towards a vortex in fluid communication with a combustion location near the cylinder central axis;
    wherein the movable piston includes a wall defining an outer side boundary of the bowl portion;
    wherein the movable piston includes a plurality of raised portions spaced from each other to define a plurality of cutouts between the respective raised portions; and wherein the raised portions surround the bowl portion, and the raised portions protrude outwardly farther from the bowl portion than the wall.

2. The direct-injection engine of claim 1 wherein the bowl portion is asymmetric relative to the cylinder central axis, and wherein the bowl portion defines a first opening edge on the intake port side that extends farther towards an outer edge of the movable piston relative to an opposing second opening edge on the exhaust port side.

3. The direct-injection engine of claim 2 wherein the bowl portion defines a radius r1 relative to the cylinder central axis and the first opening edge is extended by $\Delta r$, wherein $0.15*r1 \leq \Delta r \leq 0.35*r1$.

4. The direct-injection engine of claim 1 wherein the bowl portion defines a first depth on the intake port side that is deeper than a second depth on the exhaust port side.

5. The direct-injection engine of claim 1 wherein the angled re-entrant edge is oriented at an angle $\alpha$ relative to the cylinder central axis to direct the air-fuel mixture back toward a center of the bowl portion, and 20 degrees$\leq \alpha \leq$40 degrees.

6. The direct-injection engine of claim 1 wherein the movable piston further includes an extension wall extending from a top surface of the movable piston near an outer edge of the bowl portion.

7. The direct-injection engine of claim 6 wherein the extension wall is located on the intake port side.

8. A movable piston arranged to travel within a combustion chamber of a direct-injection engine according to a combustion cycle, the movable piston comprising:
  a side portion configured to seal against a side of the combustion chamber;
  a top surface defining a lower boundary of the combustion chamber to contain an air-fuel mixture during the combustion cycle;
  a piston bowl formed in the top surface to receive a fuel injection dispensed at a location generally along a central cylinder axis, wherein the piston bowl defines a floor portion that extends in a first direction laterally towards the side portion from the central cylinder axis a distance that is greater than an opposing second direction from the central cylinder axis; and
  wherein:
    the top surface defines a plurality of cutouts spaced from each other, and each of the cutouts surround the piston bowl and intersect the side portion;
    the floor portion extends a deeper depth on one side of the central cylinder axis that defines an intake port side than an opposing side of the central cylinder axis that defines an exhaust port side;
    the piston bowl includes a side wall extending from the floor portion toward the top surface on the intake port side;
    the piston bowl includes an angled re-entrant edge only on the intake port side;
    the top surface includes an extension wall that extends outwardly away from the piston bowl along the intake port side, and the extension wall is offset from the side wall; and
    the top surface includes a step disposed between and orientated transverse to the side wall and the extension wall to offset the extension wall from the side wall.

9. The movable piston of claim 8 wherein the first direction from the central cylinder axis is oriented on the intake port side.

10. The movable piston of claim 8 wherein the extension wall increases a height of the piston bowl on the intake port side.

11. The movable piston of claim 8 wherein the angled re-entrant edge redirects fluid flow towards a vortex in fluid communication with a combustion location near the central cylinder axis.

12. The movable piston of claim 11 wherein the angled re-entrant edge is oriented at an angle $\alpha$ relative to the central cylinder axis, and 20 degrees$\leq \alpha \leq$40 degrees.

13. A direct-injection stratified charge internal combustion engine comprising:
  a combustion cylinder configured to receive an air-fuel mixture;
  intake ports configured to inlet air into the combustion cylinder;
  exhaust ports configured to outlet exhaust from the combustion cylinder;
  a fuel injector configured to emit a fuel spray pattern within the combustion cylinder at a location substantially near a cylinder central axis to create the air-fuel mixture;
  wherein the fuel injector includes a tip that is centrally located within the combustion cylinder, and the tip is configured to spray the fuel spray pattern;
  wherein the fuel injector is centrally located between the intake ports and the exhaust ports;
  a spark igniter is located within a path of the fuel spray pattern such that a trailing edge of the fuel spray pattern when the fuel spray pattern is initially ejected from the tip is ignited to combustion of the air-fuel mixture;
  wherein a plane intersects the cylinder central axis, the fuel injector and the spark igniter such that the spark igniter aligns with the cylinder central axis and is offset from the fuel injector;
  wherein the intake ports are disposed along the combustion cylinder relative to a first side of the plane to define an intake port side of the combustion cylinder;
  wherein the exhaust ports are disposed along the combustion cylinder relative to a second side of the plane to define an exhaust port side of the combustion cylinder;
  wherein the first and second sides of the plane oppose each other;
  a movable piston includes a top surface defining a lower boundary of the combustion cylinder that contains the combustion of the air-fuel mixture;
  wherein the movable piston includes a side portion configured to seal against a side of a combustion chamber and includes a piston bowl defines a floor portion that extends laterally towards the side portion in a first direction from the cylinder central axis greater than an opposing second direction from the cylinder central axis;
  wherein the floor portion extends a deeper depth into the movable piston on the intake port side than on the exhaust port side;
  wherein the piston bowl includes a side wall extending from the floor portion toward the top surface on the intake port side;
  wherein the top surface includes an extension wall that extends outwardly away from the piston bowl along the intake port side, and the extension wall is offset from the side wall;

wherein the top surface includes a step disposed between and orientated transverse to the side wall and the extension wall to offset the extension wall from the side wall;

wherein the movable piston defines a pair of cutouts corresponding to the intake port side and defines another a pair of cutouts corresponding to the exhaust port side;

wherein the pair of cutouts for the intake port side are spaced from the pair of cutouts for the exhaust port side; and wherein the pair of cutouts for the intake port side and the pair of cutouts for the exhaust port side each surround the piston bowl and intersect the side portion.

14. The direct-injection engine of claim 13 wherein the piston bowl is asymmetric relative to a vertical axis, and wherein the piston bowl defines a first opening edge on the intake port side that extends farther towards an outer edge of the movable piston relative to an opposing second opening edge on the exhaust port side.

15. The direct-injection engine of claim 14 wherein the piston bowl defines a radius r1 relative to the cylinder central axis and the first opening edge is extended by $\Delta r$ to enhance a connection between outer portions of the air-fuel mixture and combustion portions of the air-fuel mixture, wherein $0.15*r1 \leq \Delta r \leq 0.35*r1$.

16. The direct-injection engine of claim 13 wherein the piston bowl defines a first depth on the intake port side that is deeper than a second depth on the exhaust port side.

17. The direct-injection engine of claim 13 wherein the piston bowl further defines an angled re-entrant edge located on the intake port side to redirect fluid flow towards a vortex in fluid communication with a combustion location near the cylinder central axis, and wherein the angled re-entrant edge is oriented at an angle $\theta$ relative to the cylinder central axis, and 20 degrees $\leq \theta \leq$ 40 degrees.

18. The direct-injection engine of claim 13 wherein the an extension wall extends from the top surface of the movable piston near an outer edge of the piston bowl.

19. The direct-injection engine of claim 18 wherein the extension wall is located on the intake port side.

20. The direct-injection engine of claim 13 wherein the extension wall is disposed between the pair of cutouts on the intake port side.

* * * * *